(12) United States Patent
Ko et al.

(10) Patent No.: US 7,858,249 B2
(45) Date of Patent: Dec. 28, 2010

(54) POWER SUPPLY APPARATUS AND METHOD FOR LINE CONNECTION TYPE FUEL CELL SYSTEM

(75) Inventors: Seung-Tae Ko, Seoul (KR); Myung-Seok Park, Gwangmyeong (KR)

(73) Assignees: LG Electronics Inc., Seoul (KR); LG Chem, Ltd., Seoul (KR)

( * ) Notice: Subject to any disclaimer, the term of this patent is extended or adjusted under 35 U.S.C. 154(b) by 912 days.

(21) Appl. No.: 11/609,255

(22) Filed: Dec. 11, 2006

(65) Prior Publication Data

US 2007/0134529 A1    Jun. 14, 2007

(30) Foreign Application Priority Data

Dec. 13, 2005    (KR) ............... 10-2005-0122719

(51) Int. Cl.
*H01M 8/04* (2006.01)
(52) U.S. Cl. ............. 429/428; 429/430; 429/431; 429/432
(58) Field of Classification Search ............ 429/23, 429/24, 22
See application file for complete search history.

(56) References Cited

U.S. PATENT DOCUMENTS

| 6,495,277 | B1* | 12/2002 | Edlund et al. ............ 429/22 |
| 2005/0136311 | A1* | 6/2005 | Ueda et al. ............... 429/30 |
| 2005/0184594 | A1* | 8/2005 | Fredette ................... 307/78 |

FOREIGN PATENT DOCUMENTS

| GB | 2 054 220 | 2/1981 |
| JP | 9245826 | 9/1997 |
| WO | 03/010841 | 2/2003 |

\* cited by examiner

*Primary Examiner*—Dah-Wei D Yuan
*Assistant Examiner*—Patricia Davis
(74) *Attorney, Agent, or Firm*—KED & Associates LLP

(57) ABSTRACT

The present invention discloses a power supply apparatus and method for a line connection type fuel cell system. The power supply apparatus for the line connection type fuel cell system includes: a storing unit for pre-storing a normal region and a warning region according to an operating condition of a fuel cell and a correlation between an output voltage and an output current of the fuel cell; and a control unit for detecting an operating point on the basis of the operating condition of the fuel cell, comparing the detected operating point with the normal region and the warning region, and outputting a control signal for increasing or decreasing the output current of the fuel cell according to the comparison result.

17 Claims, 3 Drawing Sheets

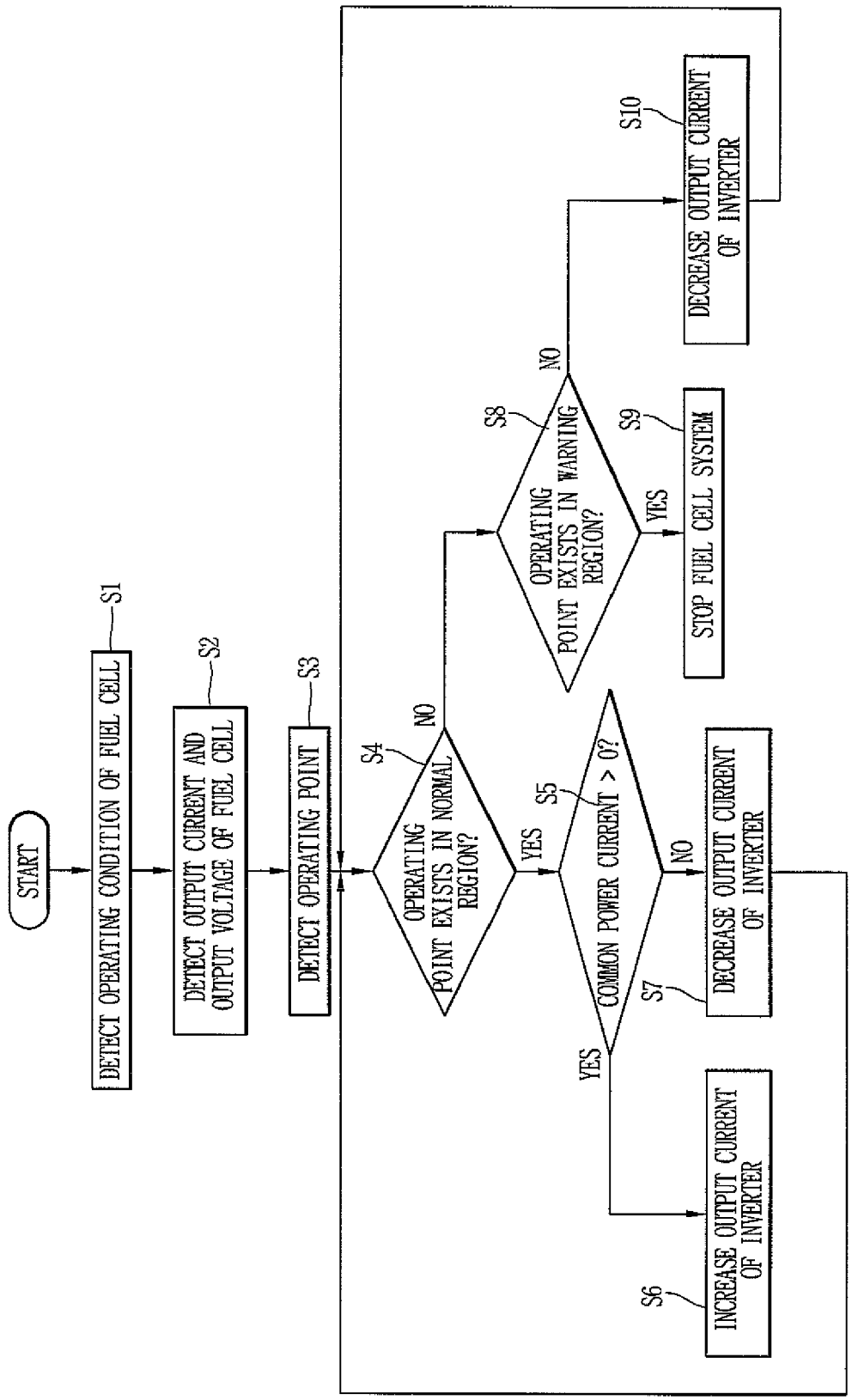

POWER SUPPLY APPARATUS AND METHOD FOR LINE CONNECTION TYPE FUEL CELL SYSTEM

BACKGROUND OF THE INVENTION

1. Field of the Invention

The present invention relates to a fuel cell, and more particularly, to a power supply apparatus and method for a line connection type fuel cell system which can improve operating efficiency and economical efficiency of the fuel cell system by automatically controlling an output current of a fuel cell to be maximized.

2. Description of the Background Art

In general, a fuel cell is an apparatus for directly converting energy of fuel into electric energy. In the fuel cell, an anode and a cathode are installed at both sides of a polymer electrolyte film. Electrochemical oxidation of hydrogen, which is a fuel, is generated in the anode (or oxidation electrode), and electrochemical deoxidation of oxygen, which is an oxidizing agent, is generated in the cathode (or deoxidation electrode). That is, the fuel cell generates electrons by the electrochemical oxidation and deoxidation, and generates electric energy by movement of the electrons.

Exemplary fuel cells include a phosphoric acid fuel cell, an alkaline fuel cell, a proton exchange membrane fuel cell, a molten carbonate fuel cell, a solid oxide fuel cell, and a direct methanol fuel cell. In addition, the fuel cells can be classified into a commercial fuel cell, a home fuel cell, a vehicle fuel cell for an electric vehicle, and a small-sized fuel cell for a portable terminal or a notebook computer by used fields. Especially, the home fuel cell has been improved to efficiently operate an electric home appliance or a lighting apparatus in a house, and the commercial fuel cell has been improved to efficiently operate a lighting apparatus, a motor or a machine in a shopping center or a factory.

The fuel cell system is linked with a line power supply system (e.g., a public power company). If power supplied to a load is deficient, the fuel cell system is supplied with the deficient quantity of power from the line power supply system, and if power supplied to the load is too much, the fuel cell system supplies the surplus power to the line power supply system.

FIG. 1 is a block diagram illustrating a conventional power supply apparatus for a line connection type fuel cell system. Referring to FIG. 1, the conventional power supply apparatus includes a fuel cell 1, a power converting unit 2, and a line power supplying unit 3. The fuel cell 1 includes a stack (not shown) comprised of an anode and a cathode for generating electricity by electrochemical reactions of hydrogen and oxygen, and generates a DC voltage from the stack (not shown). The power converting unit 2 includes a DC/DC converting unit (not shown) for converting the DC voltage into an AC voltage, boosting or dropping the AC voltage, rectifying the resulting voltage, and outputting a DC voltage. The power converting unit 2 also includes an inverter (not shown) for converting the DC voltage from the DC/DC converting unit into an AC voltage.

The line power supplying unit 3 supplies common power to each house or public facility (load). That is, the fuel cell system and the line power supplying unit 3 are linked to each other, for supplying power to each house or public facility.

In the case that power generated in the fuel cell system is sold to a public power company (line power supplying unit), if a current outputted from the fuel cell 1 is larger than a preset maximum output current, the current is decreased. In addition, in the case that power generated in the fuel cell system is sold to a public power company (line power supplying unit), if a voltage outputted from the fuel cell 1 is lower than a minimum output voltage, the output current of the fuel cell 1 is decreased. That is, the conventional fuel cell system maintains at least a specific minimum output voltage of the fuel cell.

However, even if the output voltage is lower than the probable minimum voltage, if the output current is reduced, the fuel cell system is stably operated. Nevertheless, when the output voltage of the fuel cell is lower than the probable minimum voltage, driving of the fuel cell is stopped, which narrows an operating available width of the fuel cell system. As a result, operating efficiency of the fuel cell system is reduced.

The subject matter claimed herein is not limited to embodiments that solve any disadvantages or that operate only in environments such as those described above. Rather, this background is only provided to illustrate one exemplary technology area where some embodiments described herein may be practiced.

SUMMARY OF THE INVENTION

The present invention provides a power supply apparatus and method for a line connection type fuel cell system which can improve operating efficiency and economical efficiency of the fuel cell system, by presetting a normal region which is a stable operating region of a fuel cell, detecting a current operating point of the fuel cell according to an output voltage, an output current and an operating condition of the fuel cell in sale of the fuel cell, and automatically controlling the output current of the fuel cell to be maximized so that the detected operating point can exist in the normal region.

To achieve these and other advantages and in accordance with the purpose of the present invention, as embodied and broadly described herein, a power supply apparatus is provided for a line connection type fuel cell system, including: a storing unit for pre-storing a normal region and a warning region according to an operating condition of a fuel cell and a correlation between an output voltage and an output current of the fuel cell; and a control unit for detecting an operating point on the basis of the operating condition of the fuel cell, comparing the detected operating point with the normal region and the warning region, and outputting a control signal for increasing or decreasing the output current of the fuel cell according to the comparison result.

Another embodiment is directed to a method for a line connection type fuel cell system, including the steps of: detecting an operating point of a fuel cell; comparing the operating point with a normal region and a warning region; and varying an output current of the fuel cell according to the comparison result.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a flowchart showing sequential steps of a power supply method for a fuel cell system in accordance with the present invention.

DETAILED DESCRIPTION OF THE INVENTION

Reference will now be made in detail to the accompanying drawings which form a part hereof, and in which are shown by way of illustration specific embodiments in which the invention may be practiced. It is to be understood that other embodiments may be utilized and structural changes may be made without departing from the scope of the present invention.

Embodiments of the present invention relate to a power supply apparatus and method for a line connection type fuel cell system which can improve operating efficiency and economical efficiency of the fuel cell system by automatically controlling an output current of a fuel cell to be maximized.

Figure 1:
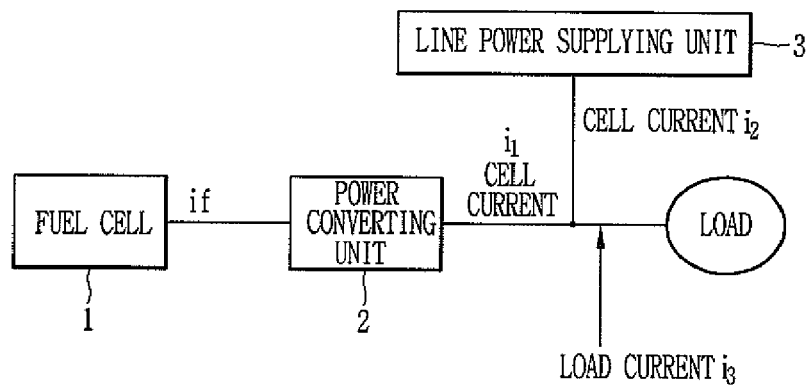
FIG. 1 is a block diagram illustrating a conventional line connection type fuel cell system.
Figure 2:
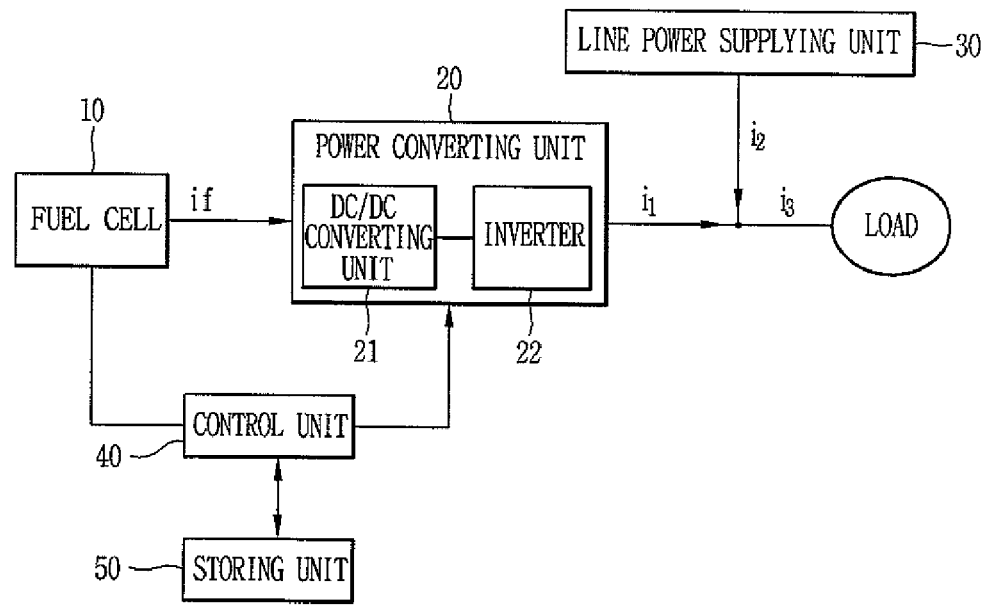
FIG. 2 is a block diagram illustrating a power supply apparatus for a fuel cell system in accordance with the present invention.

As illustrated in FIG. 2, the power supply apparatus for the line connection type fuel cell system may include a fuel cell 10, a power converting unit 20, a line power supplying unit 30, a control unit 40 and a storing unit 50. The fuel cell 10 includes a stack (not shown) comprised of an anode and a cathode for generating electricity by electrochemical reactions of hydrogen and oxygen, and generates a DC voltage from the stack (not shown). The power converting unit 20 converts the DC voltage from the fuel cell 10 into a predetermined level AC voltage and outputs the AC voltage. In one embodiment, the power converting unit 20 includes a DC/DC converting unit 21 and an inverter 22.

In one embodiment, the DC/DC converting unit 21 converts the DC voltage into an AC voltage, boosts or drops the AC voltage, rectifies the resulting voltage, and outputs a DC voltage. The inverter 22 converts the DC voltage from the DC/DC converting unit 21 into an AC voltage according to a control signal, and outputs the AC voltage. In accordance with the present invention, the DC/DC converting unit 21 varies an output current according to a control signal, such that the fuel cell system illustrated in FIG. 2 operates in a normal region.

The line power supplying unit 30 supplies common power to each house or public facility (load). In one embodiment, the storing unit 50 presets and pre-stores a normal region which is a stable operating region of the fuel cell 10. The storing unit 50 may also pre-store a warning region. The warning region may be determined by using load characteristic curves by an operating condition of the fuel cell 10 and a correlation between an output voltage and an output current of the fuel cell 10.

Figure 3:
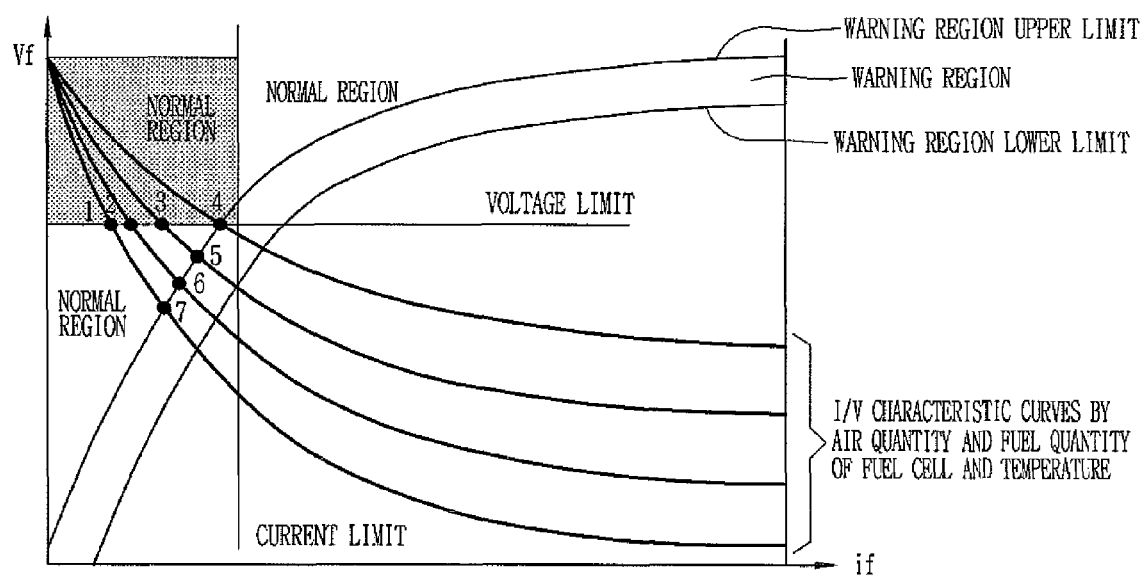
FIG. 3 is a graph showing a correlation between an output voltage and an output current of a fuel cell in FIG. 2.

As shown in FIG. 3, the normal region and the warning region may be set on the basis of characteristic curves by the operating condition, as determined by the output current and the output voltage of the fuel cell 10 and preset load corresponding curves. The control unit 40 detects an operating point of the fuel cell 10, compares the operating point with the normal region and the warning region, and outputs a control signal for increasing or decreasing the output current of the fuel cell 10 according to the comparison result. That is, when the detected operating point exists in the warning region, the control unit 40 may decrease the output current of the fuel cell 10. When the detected operating point exists in the normal region, the control unit 40 may increase the output current of the fuel cell 10. When the detected operating point does not exist in the normal region or the warning region, the control unit 40 stops, i.e., disables, the fuel cell system.

In accordance with the present invention, power generated in the fuel cell system may be sold to a load, such as a power company or a residential or commercial application. In one embodiment, the generated power can be maximally supplied to the load, for demanding payment from the load. In one embodiment, even if the operating point of the fuel cell 10 exists in the normal region, the current may be maximized to generate the maximum output.

FIG. 4 illustrates one embodiment of a method of operating a power supply apparatus for the line connection type fuel cell system in accordance with the present invention. The storing unit 50 presets and pre-stores the normal region which is a stable operating region of the fuel cell 10 and the warning region on the basis of the characteristic curves by the operating condition of the fuel cell 10 and the correlation between the output voltage and the output current of the fuel cell 10, and the load corresponding curves, as illustrated in FIG. 3. The operating condition may include an air quantity and a fuel quantity supplied to the fuel cell 10, and an external temperature.

In this state, the stack (not shown) of the fuel cell 10, including the anode and the cathode, generates electricity by electrochemical reactions of hydrogen and oxygen, and applies a resulting DC voltage to the DC/DC converting unit 21 of the power converting unit 20. The DC/DC converting unit 21 converts the DC voltage from the fuel cell 10 into an AC voltage, boosts or drops the AC voltage, rectifies the boosted or dropped AC voltage into a DC voltage, and applies the DC voltage to the inverter 22. The inverter 22 converts the DC voltage from the DC/DC converting unit 21 into a predetermined level AC voltage according to the control signal, and outputs the AC voltage.

The control unit 40 detects the operating condition, the output current and the output voltage of the fuel cell 10 (S1 and S2), and detects the current operating point of the fuel cell 10 by using the detected operating condition, output current and output voltage (S3). The control unit 40 determines whether the detected operating point exists in the normal region (S4).

According to the determination results (S4 and S8), when the detected operating point does not exist in the normal region or the warning region, the control unit 40 decreases the output current of the fuel cell 10, for example, by decreasing the output current of the inverter (S10). In one embodiment, the control unit 40 decreases the output current of the fuel cell 10 by controlling conversion (boosting or dropping) of the DC/DC converting unit 21 of the power converting unit 20. That is, the control unit 40 lowers the output voltage of the fuel cell 10 by dropping the DC voltage generated in the fuel cell 10 by the DC/DC converting unit 21.

The control unit 40 decreases the output current of the fuel cell 10 until the detected operating point exists in the normal region. According to the determination results (S4 and S8), when the detected operating point does not exist in the normal region, but does exist in the warning region, the control unit 40 stops the operation of the fuel cell system (S9).

According to the determination result (S4), when the detected operating point exists in the normal region, and the common power current is greater than zero, the control unit 40 increases the output current of the fuel cell 10, for example, by increasing the output current of the inverter (S6). When the detected operating point exists in the normal region, but the common power current is less than or equal to zero, the control unit 40 decreases the output current of the fuel cell 10, for example, by decreasing the output current of the inverter.

In one embodiment of the present invention, it is presumed that power generated in the fuel cell system is sold. Therefore, the output current of the fuel cell system can be outputted with the maximum value in the normal region range of the fuel cell system.

Referring again to FIG. 3, conventional power supply systems may set operating points 1, 2, 3 and 4 as the probable minimum voltage of the fuel cell. When the output voltage of the fuel cell is reduced below the probable minimum voltage, the fuel cell system is stopped. Conversely, in accordance with the present invention, even if the output voltage of the fuel cell is reduced below the probable minimum voltage of the operating points 1-4, the output current of the fuel cell is reduced so that the fuel cell system can be operated in operating points 5, 6 and 7.

As discussed earlier, in accordance with the present invention, the power supply apparatus for the line connection type fuel cell system presets the normal region which is a stable operating region of the fuel cell, detects the current operating point of the fuel cell according to the output voltage, the output current and the operating condition of the fuel cell in sale of the fuel cell, and automatically controls the output current of the fuel cell to be maximized so that the detected operating point can exist in the normal region. As a result, operating efficiency and economical efficiency of the fuel cell system can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A power supply control apparatus for a line connection type fuel cell system, comprising:
   a storing unit for pre-storing information indicative of a normal region and a warning region corresponding to operation of a fuel cell; and
   a controller to detect an operating point of the fuel cell, compare the operating point with the information indicative of at least one of the normal region or the warning region, and output a control signal for increasing or decreasing current of the fuel cell according to a result of the comparison, wherein the normal region and warning region are based on intersections between a plurality of characteristic curves and one or more preset load curves, each characteristic curve identifying current and voltage values of the fuel cell under different conditions.

2. The power supply control apparatus as claimed in claim 1, wherein the different conditions comprise one or more of an air quantity supplied to the fuel cell, a fuel quantity supplied to the fuel cell, or an external temperature.

3. The power supply control apparatus as claimed in claim 1, wherein the controller detects the operating point of the fuel cell based on a voltage and current from the fuel cell for an existing operating condition.

4. The power supply control apparatus as claimed in claim 1, comprising a power converter to increase or decrease the fuel cell current according to the control signal.

5. The power supply control apparatus as claimed in claim 4, wherein the power converter comprises a DC/DC converter to increase or decrease the fuel cell current by boosting or dropping a DC voltage from the fuel cell according to the control signal.

6. The power supply control apparatus as claimed in claim 1, wherein, when the detected operating point exists in the warning region, the controller decreases the fuel cell current.

7. The power supply control apparatus as claimed in claim 6, wherein the controller decreases fuel cell current until the detected operating point exists in the normal region.

8. The power supply control apparatus as claimed in claim 1, wherein, when the detected operating point exists in the normal region, the controller increases the fuel cell current.

9. The power supply control apparatus as claimed in claim 8, wherein the controller increases fuel cell current as long as the detected operating point does not exceed the normal region.

10. The power supply control apparatus as claimed in claim 1, wherein, when the detected operating point does not exist in the normal region and does exist in the warning region, the controller stops the fuel cell system.

11. The power supply control apparatus as claimed in claim 1, wherein the control signal allows fuel cell current to continue to be generated when the operating point falls below a minimum voltage value of the normal region and passes into the warning region.

12. The power supply control apparatus as claimed in claim 11, wherein the control signal decreases the fuel cell current to a non-zero value when the operating point falls below said minimum voltage value.

13. The power supply control apparatus as claimed in claim 12, the control signal decreases the fuel cell to a current value that substantially corresponds to an intersection point between one of the characteristic curves and one of the preset load curves.

14. The power supply control apparatus as claimed in claim 13, wherein each characteristic curve corresponds to a predetermined air quantity supplied to the fuel cell, a predetermined fuel quantity supplied to the fuel cell, and a predetermined external temperature different from an air quantity, fuel quantity, and external temperature for remaining ones of the characteristic curves.

15. The power supply control apparatus as claimed in claim 1, wherein the control signal decreases the fuel cell current to a non-zero value when:
   (a) the operating point is in the normal region, and
   (b) common power current from an external current source is substantially zero or less than zero.

16. The power supply control apparatus as claimed in claim 1, wherein the control signal increases the fuel cell current when:
   (a) the operating point is in the normal region, and
   (b) common power current from an external source is substantially greater than zero.

17. The power supply control apparatus as claimed in claim 16, wherein the control signal decreases the fuel cell current to a non-zero value when:
   (a) the operating point is in the normal region, and
   (b) common power current from the external current source is substantially zero or less than zero.

* * * * *